United States Patent [19]

Pfeffer et al.

[11] 4,100,474
[45] Jul. 11, 1978

[54] MULTI-VOLTAGE VEHICULAR NETWORK SYSTEM

[75] Inventors: Peter Pfeffer, Lauffen; Istvan Ragaly, Schwieberdingen, both of Fed. Rep. of Germany

[73] Assignee: Robert Bosch GmbH, Stuttgart, Fed. Rep. of Germany

[21] Appl. No.: 751,438

[22] Filed: Dec. 16, 1976

[30] Foreign Application Priority Data

Jan. 31, 1976 [DE] Fed. Rep. of Germany ....... 2603783

[51] Int. Cl.² ................................................ H02J 7/14
[52] U.S. Cl. ....................................... 320/17; 320/61; 322/28; 322/90
[58] Field of Search ...................... 320/15, 16, 17, 61; 322/28, 90; 361/59–61

[56] References Cited

U.S. PATENT DOCUMENTS

| 2,353,410 | 7/1944 | Marshall et al. | 320/18 |
|---|---|---|---|
| 3,206,610 | 9/1965 | Lovrenich | 320/15 |
| 3,624,480 | 11/1971 | Campbell et al. | 320/15 |
| 3,982,169 | 9/1976 | Cummins | 322/28 |

FOREIGN PATENT DOCUMENTS

| 577,817 | 6/1946 | United Kingdom | 322/90 |

*Primary Examiner*—Robert J. Hickey
*Attorney, Agent, or Firm*—Flynn & Frishauf

[57] ABSTRACT

To provide a dual-voltage network for the on-board electrical system of automotive vehicles, for example to provide a higher voltage for starting of the vehicle and a normal on-board voltage for operation of vehicle appliances such as lamps, fans, motors, and the like, while using only a single voltage regulator to control the charge voltage for the vehicle battery, a voltage doubler circuit is provided which is connected to the on-board network by a diode and a coupling capacitor connected to an a-c output of a vehicle alternator, the diode being connected between the d-c output and the rectifier connected to the alternator and the capacitor so that a voltage regulator, connected to the d-c output, can accurately control the output voltage of the alternator.

10 Claims, 1 Drawing Figure

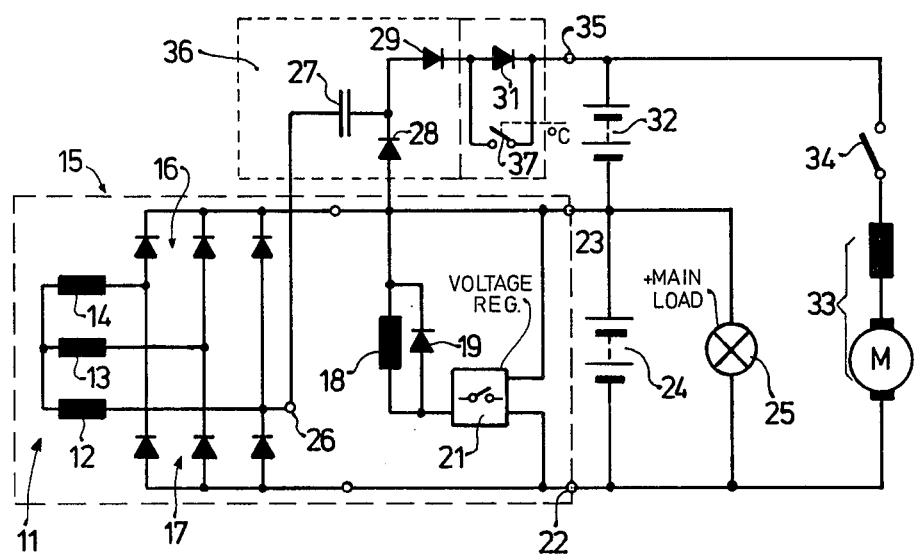

MULTI-VOLTAGE VEHICULAR NETWORK SYSTEM

The present invention relates to a multi-voltage, self-contained network system, for example for use as the on-board network system of automotive vehicles. Such network systems have been proposed, providing two voltage levels, one for the operation of appliances of the on-board network such as headlamps, fans, electronic equipment including radios and the like; and a higher voltage for use under starting conditions. An arrangement of this type is illustrated, for example, in French Patent No. 74 25,200.

The main power network for the vehicle provides the usual loads, such as the illuminating system, the ignition system, and the like; the additional high-voltage network may be provided for example for the starter or for operation under starting conditions. Each one of the on-board networks has its own battery; for example, the main network has a 12 V battery, and the additional network has a 24 V battery or a further 12 V battery, series connected to the main battery of the main network.

The voltage level of the output of the vehicle generator, typically an alternator with a connected rectifier network, is controlled by a voltage regulator. This voltage regulator cyclincally energizes the field winding of the alternator, so that the alternator is either excited or not. It does not appear necessary to separately control the voltage of the additional or auxiliary higher voltage network. Thus, the previously known multi-voltage networks use a voltage doubling circuit connected to two phases of the phase windings of the alternator. The power delivery of the generator is controlled by the charge state of the battery of the main, for example 12 V, network.

It has been found that the arrangement results in excessive charge of the battery of the auxiliary network, in that the voltage applied to the battery of the auxiliary network, on the average, is too high. Thus, the auxiliary battery is constantly excessively charged — particularly when long continuous trips are undertaken by the user of the vehicle. The battery, therefore, is subject to damage which is well known if the battery is continuously subjected to excessive charge voltages.

It is an object of the present invention to provide a simple, multi-level network system, particularly for automotive vehicles, in which the auxiliary battery is only properly charged during operation of the vehicle.

Subject matter of the present invention

Briefly, the on-board network system has an alternator with armature windings and a field. A rectifier system is connected to the armature windings and provides a d-c output. A voltage regulator is connected to the alternator at the d-c output terminals to control the voltage of the output terminals by cyclically energizing and de-energizing the field thereof. A voltage doubler circuit, including a capacitor and two series connected diodes is provided, the capacitor being connected to the junction between a series connected diode and one of the armature windings of the alternator, the output of the double voltage being taken from an output terminal connected to the free terminal of one of the dioes, In accordance with the present invention, the other diode of the two series connected diodes has its free terminal connected to one of the d-c output terminals of the rectifier.

This simple and effective type of connection has the advantage with respect to known systems that the voltage control which is effected by the voltage regulator controls the voltage for the additional or auxiliary network as well as the voltage of the main network. As an additional and ancillary advantage, it is only necessary to connect the capacitor to one simple phase terminal, so that only a single-phase terminal of the armature of the alternator has to be specially connected to permit installation of a duel-voltage network in the vehicle.

The output voltage can additionally be accurately controlled by providing an output diode, series connected with the two serially connected diodes, which further diode can be short-circuited by a short-circuiting switch if the load on the higher voltage network is heavy; or the switch can be opened to provide an additional voltage drop through the diode. Thus, the generator output voltage at the high-voltage terminal for the auxiliary network can be accurately matched to a desired voltage level.

The invention will be described by way of example with reference to the accompanying drawing, wherein the single FIGURE is a schematic circuit diagram of the network system in accordance with the present invention.

A three-phase alternator having an armature 11 with three phase windings 12, 13, 14 is connected to a rectifier bank 15. The rectifier bank 15 has positive connection diodes 16 and negative connection diodes 17. A field winding 18 is selectively energized in accordance with control by a voltage regulator. A free-wheeling diode 19 is connected in parallel to the field winding 18. The field winding 18 is connected between the positive output terminal or bus 23 of the rectifier and the output terminal of a voltage regulator 21. One input of the voltage regulator 21 is connected to the negative output bus or terminal 22, the other terminal of the voltage regulator being connected to the positive bus 23. The main on-board network of the vehicle is schematically represented by a main battery 24 and one or more loads, symbolically represented by a lamp 25.

An additional terminal 26 is connected to one phase winding, as illustrated to phase winding 12 at the end remote from the star or center connection of the armature windings 12–14. One terminal of capacitor 27 is connected to the terminal 26. Two series connected diodes 28, 29 are provided, the junction of the series connected diodes being connected to the other terminal of capacitor 27. The anode of the first diode 28 is connected to the positive bus 23 of the rectifier output. The diodes are poled in series, so that the cathode of diode 28 is connected to the junction between capacitor 27 and additionally to the anode of diode 29. The cathode of the second diode 29 is connected to the positive terminal 35 which forms the output terminal of the auxiliary network and additionally the positive terminal of the auxiliary battery 32. The negative terminal of the auxiliary battery 32 is connected to the positive terminal or bus 23 and hence to the positive terminal of the main battery 24. The two serially connected batteries 24, 32 provide the auxiliary network of higher voltage, suitable for special loads, for example for a starter 33 which can be connected by closing a switch 34.

The capacitor 27, the first diode 28 and the second diode 29, in combination with the rectifier 15 and armature 11, form a voltage doubler circuit which is known as such. The second auxiliary voltage which supplies the voltage doubler circuit, in accordance with the present invention, is connected to positive bus or terminal 23 and thus behind the rectifying diodes 16. Thus, the voltage drop, particularly the voltage drop through the positive diode 16, is effective in the voltage doubling circuit. As a result, control of the generator output voltage by the voltage regulator 21 also completely considers the doubled voltage. If slight additional excess voltage should be present, a further diode 31 can readily be connected in series with the diode 29. Diode 31 is poled in passing direction. The output terminal 35 will thus have a controlled output voltage appear thereat which is controlled, so that the additional battery 32 is not overloaded. A switch 37 can be provided, connected across diode 31 and controlled by a control terminal °C. Diode 31 can be shorted by switch 37 under control of ambient or operating parameters; for example, diode 31 suitably is shorted during the cold season in order to improve the output level of battery 32. Switch 37 can, accordingly, be controlled manually or by a thermostatic switch symbolized by the broken connection °C.

The capacitor 27, the first diode 28 and the second diode 29 preferably are included in a separate and distinct housing 36 which can be attached to the generator structure and merely connected to the already present terminals 23 and 26. The additional diode 21, as well as switch 37, likewise can be included in the housing 36.

Various changes and modifications may be made within the scope of the inventive concept.

We claim:
1. Multi-voltage vehicular network system having
   an alternator (11) having armature windings (12, 13, 14) and a field (18);
   a rectifier system (15) connected to the armature windings, supplied from the alternator at a first voltage level and providing a d-c output at d-c output terminals (22, 23);
   a voltage regulator (21) connected to the alternator, responsive to the alternator voltage at said first voltage level and controlling the output voltage thereof;
   a voltage doubling circuit (36) including a capacitor (27) and two series connected diodes (28, 29) and providing output voltage at a second and higher level than said first level at a double voltage output terminal (35), connected to the free terminal of one (29) of said diodes (28, 29),
   wherein, the capacitor (27) of the voltage doubling circuit is connected to the junction between the series connected diodes and to an armature winding (12) of the alternator, and the other diode (28) has its free terminal connected to one (23) of the d-c output terminals (22, 23) and forming the output of the rectifier system (15) at said first voltage level to provide a doubled output voltage at said double voltage terminal (35) derived from the alternator supplying the rectifier at said first voltage level and which is regulated in accordance with the control by said voltage regulator (21).

2. System according to claim 1, and comprising a further diode (31) serially connected with said second diode (29) and poled in current passing direction with respect thereto.

3. System according to claim 1, further comprising an individual housing (36), the capacitor and said first and second diodes (28, 29) being included in said housing, said housing being secured to the alternator (11).

4. System according to claim 2, further comprising an individual housing (36), the capacitor (27), the first and second diodes (28, 29) and said further diode (31) being included in said housing, said housing being secured to the alternator (11).

5. System according to claim 2, further comprising a shunting switch (37) connected to shunt the further diode (31).

6. System according to claim 5, wherein said shunting switch (37) is a temperature-controlled, temperature-responsive switch.

7. Automotive vehicle multi-voltage vehicular network system
   comprising the system of claim 1
   wherein the alternator (11) is a threee-phase alternator, and one armature winding forms the winding of one phase.

8. System according to claim 7, including a first load (25) comprising illumination means connected to the output of the d-c output terminals (22,23);
   and a second load (33) connected during starting of the engine of the automotive vehicle and electrically connected with the double voltage output terminal (35) and the other one of the d-c output terminals (22).

9. System according to claim 7, including a further diode (31) serially connected between the second diode (29) and said double voltage output terminal (35).

10. System according to claim 9, further including a shunting switch (37) connected in shunt with the further diode (31), said shunting switch being connectable to open if the ambient temperature of operation of the vehicle system drops below a predetermined level.

* * * * *